(12) United States Patent
Nakamura et al.

(10) Patent No.: US 8,623,313 B2
(45) Date of Patent: Jan. 7, 2014

(54) AMMONIA SYNTHESIS PROCESS (75) Inventors: Norihiko Nakamura, Mishima (JP);
Haruyuki Nakanishi, Susono (JP);
Hidekazu Arikawa, Susono (JP);
Susumu Hikazudani, Takatsuki (JP);
Chikashi Inazumi, Kyoto (JP)

(73) Assignees: Toyota Jidosha Kabushiki Kaisha, Toyota (JP); Hitachi Zosen Corporation, Osaka (JP)

( * ) Notice: Subject to any disclaimer, the term of this patent is extended or adjusted under 35 U.S.C. 154(b) by 0 days.

(21) Appl. No.: 13/143,619

(22) PCT Filed: Dec. 22, 2009

(86) PCT No.: PCT/JP2009/071843
§ 371 (c)(1),
(2), (4) Date: Aug. 4, 2011

(87) PCT Pub. No.: WO2010/079726
PCT Pub. Date: Jul. 15, 2010

(65) Prior Publication Data
US 2011/0286907 A1 Nov. 24, 2011

(30) Foreign Application Priority Data
Jan. 9, 2009 (JP) .................................. 2009-003851

(51) Int. Cl.
*C01C 1/04* (2006.01)
(52) U.S. Cl.
USPC ........................................ 423/352; 423/359
(58) Field of Classification Search
USPC ................................................. 423/352, 359
See application file for complete search history.

(56) References Cited

U.S. PATENT DOCUMENTS

| 4,172,885 A | 10/1979 | Perry |
| 4,537,760 A * | 8/1985 | Lavie ............................ 423/359 |
| 5,397,559 A * | 3/1995 | Kogan .......................... 423/579 |
| 6,241,955 B1 | 6/2001 | Alvarez, Jr. |
| 6,282,880 B1 | 9/2001 | Wallace et al. |

(Continued)

FOREIGN PATENT DOCUMENTS

| CN | 1505591 A | 6/2004 |
| CN | 1760128 A | 4/2006 |

(Continued)

OTHER PUBLICATIONS

Kodama et al, "Thermochemical Cycles for High-Temperature Solar Hydrogen Production" 2007, Chem. Rev. vol. 107, pp. 4048-4077.*

(Continued)

*Primary Examiner* — Ngoc-Yen Nguyen
*Assistant Examiner* — Justin Bova
(74) *Attorney, Agent, or Firm* — Oliff & Berridge, PLC (57) ABSTRACT

The invention provides a process for efficient synthesis of ammonia. The process includes a water-splitting step in which water is decomposed to obtain a first source gas comprising hydrogen and oxygen, a first oxygen removal step in which the oxygen contained in the first source gas is at least partially separated and removed by an oxygen separating membrane or hydrogen separating membrane to obtain a second source gas having a lower oxygen concentration than the first source gas, a second oxygen removal step in which the oxygen in the second source gas is reacted with hydrogen to produce water for removal, or is adsorbed onto an adsorption medium for removal, to obtain a third source gas having a lower oxygen concentration than the second source gas, and an ammonia synthesis step in which the hydrogen in the third source gas is reacted with nitrogen to synthesize ammonia.

6 Claims, 8 Drawing Sheets

(56) References Cited

U.S. PATENT DOCUMENTS

2001/0018039 A1 8/2001 Gam
2005/0019244 A1 1/2005 Spiegelman et al.

FOREIGN PATENT DOCUMENTS

| JP | A-54-157797 | 12/1979 |
|---|---|---|
| JP | A-2000-007325 | 1/2000 |
| JP | A-2000-247632 | 9/2000 |
| JP | A-2001-240412 | 9/2001 |
| JP | A-2002-536276 | 10/2002 |
| JP | A-2003-267725 | 9/2003 |
| JP | A-2006-528128 | 12/2006 |
| JP | A-2008-055295 | 3/2008 |
| JP | A-2008-062188 | 3/2008 |
| WO | WO 02/070403 A1 | 9/2002 |

OTHER PUBLICATIONS

Kaneko et al, "Rotary-Type Solar Reactor for Solar Hydrogen Production with Two-step water splitting process," 2007, Energy & Fuels vol. 21, pp. 2287-2293.*

International Search Report cited in International Application No. PCT/JP2009/071843 dated Mar. 30, 2010.

Kogan, "Direct Solar Thermal Splitting of Water and On-Site Separation of the Products—II. Experimental Feasibility Study," *International Journal of Hydrogen Energy*, 1998, pp. 89-98, vol. 23, No. 2, Elsevier Science Ltd., Great Britain.

Kogan, "Direct solar thermal splitting of water and on-site separation of the products—IV. Development of porous ceramic membranes for a solar thermal water-splitting reactor," *International Journal of Hydrogen Energy*, 2000, pp. 1043-1050, vol. 25, Elsevier Science Ltd.

Kodama, "High-temperature solar chemistry for converting solar heat to chemical fuels," *Progress in Energy and Combustion Science*, 2003, pp. 567-597, vol. 29, Elsevier Ltd.

Abanades et al., "Thermochemical hydrogen production from a two-step solar-driven water-splitting cycle based on cerium oxides," *Solar Energy*, 2006, pp. 1611-1623, vol. 80, Elsevier Ltd.

Extended European Search Report issued in European Application No. 09837611.4 dated Jul. 2, 2012.

* cited by examiner

AMMONIA SYNTHESIS PROCESS

The present invention relates to an ammonia synthesis process for synthesizing ammonia by reaction between hydrogen and nitrogen.

BACKGROUND ART

Chemical synthesis of ammonia was successfully accomplished, by mass production, for the first time about 100 years ago by the German researchers Haber and Bosch. Haber-Bosch synthesis is the reaction represented by formula (1) below, and because it is simple and relatively efficient, it is still used in its same basic form even at the current time.

$$N_2 3H_2 \rightarrow 3NH_3 (\text{about } 400° \text{ C.}) \quad (1)$$

Modifications to Haber-Bosch synthesis have been proposed in Patent document 1, for example, wherein the catalyst layer is separated into three layers, and heat exchange of reactive gas is carried out between each separated catalyst layer for intercooling, whereby the ammonia yield is increased based on equilibrium theory.

Conventionally, synthesis of ammonia from hydrogen and nitrogen has been accomplished using iron catalysts, but recently utilization of ruthenium-containing catalysts has been proposed for further reaction temperature reduction, so that increased ammonia yield can be achieved based on equilibrium theory.

The hydrogen used for synthesis of ammonia has conventionally been obtained using natural gas composed mainly of methane ($CH_4$). Methane has a global warming potential of 23, where the global warming potential of carbon dioxide is defined as 1, and therefore leakage of natural gas during harvesting and use of natural gas composed mainly of methane has an adverse effect on global warming. Depletion of fossil fuels such as natural gas is also a serious issue. In addition, the use of natural as releases carbon dioxide as an essential combustion gas, and this also adversely affects global warming. It has therefore been proposed to obtain hydrogen by electrolysis of water, for synthesis of ammonia.

Patent document 2 relates to use of a ruthenium-containing catalyst for synthesis of ammonia from hydrogen and nitrogen, and to production of hydrogen for ammonia synthesis by electrolysis of water. The document teaches that ruthenium-containing catalysts are poisoned by water, carbon monoxide, oxygen and the like, and describes purification of the hydrogen and nitrogen used as starting materials for ammonia synthesis, in order to prevent such poisoning of ruthenium-containing catalysts. Specifically, Patent document 2 teaches that ruthenium-containing catalysts are poisoned by at least 1 ppm of trace oxygen, and at least 30 ppm of trace moisture, and trace carbon monoxide.

For purification of hydrogen and nitrogen as starting materials for ammonia synthesis, and particularly for removal of oxygen from hydrogen and nitrogen, Patent document 2 specifically proposes circulating a mixed gas of hydrogen and nitrogen through a reactor for removing trace oxygen (catalyst tube) packed with an oxidation catalyst, and thereby reacting the hydrogen and oxygen to produce water, and removing it.

Incidentally, in Patent document 3, there is proposed a method in which hydrogen is obtained by electrolysis of water and the hydrogen is passed through a metal oxide adsorption medium bed to remove impurities such as $H_2O$, CO, $CO_2$, $O_2$ and hydrocarbons, in order to obtain high-purity ammonia to be used in a light emitting diode (LED) manufacturing process.

CITATION LIST

Patent Literature

Patent document 1 Japanese Unexamined Patent Publication No. 2001-240412

Patent document 2 Japanese Unexamined Patent Publication No. 2003-267725

Patent document 3 Japanese Patent Public Inspection No. 2006-528128

SUMMARY OF THE INVENTION

Problems to be Solved by the Invention

As mentioned above, removal of oxygen from hydrogen and nitrogen, as starting materials for ammonia synthesis, has been proposed with the aim of preventing poisoning of ammonia synthetic catalysts and especially ruthenium-containing catalysts. For removal of oxygen, there have been proposed utilization of oxidation catalysts to react hydrogen with oxygen to produce water, and adsorption of oxygen in metal oxide adsorption medium beds.

However, when hydrogen and oxygen are reacted to remove oxygen, the large amount of oxygen to be removed increases the consumption of hydrogen in the oxygen removal step, thus lowering the efficiency of the ammonia synthesis process. Moreover, when oxygen is removed by adsorption in an adsorption medium bed, the large amount of oxygen to be removed requires the use of large amounts of adsorption medium in the oxygen removal step. Incidentally, removal of oxygen from the source gas for ammonia synthesis is preferred to prevent consumption of the final ammonia product by its reaction with oxygen.

Furthermore, as mentioned above, when natural gas is used to obtain hydrogen for synthesis of ammonia, release of methane and/or carbon dioxide into the atmosphere produces an adverse effect on global warming.

According to the invention, these problems are solved to provided a process for efficient synthesis of ammonia.

Means for Solving the Problems

<1> An ammonia synthesis process comprising:
(a) a water-splitting step in which water is decomposed to obtain a first source gas comprising hydrogen and oxygen,
(b) a first oxygen removal step in which the oxygen contained in the first source gas is at least partially separated and removed by an oxygen separating membrane or hydrogen separating membrane to obtain a second source gas having a lower oxygen concentration than the first source gas,
(c) a second oxygen removal step in which the oxygen in the second source gas is reacted with hydrogen to produce water for removal, or is adsorbed onto an adsorption medium for removal, to obtain a third source gas having a lower oxygen concentration than the second source gas, and
(d) an ammonia synthesis step in which the hydrogen in the third source gas is reacted with nitrogen to synthesize ammonia.

<2> The process of <1> above, wherein in the water-splitting step (a), the water is decomposed by direct thermal decomposition, thermochemical decomposition or photocatalytic decomposition to obtain the first source gas.

<3> The method according to <2> above, wherein in the water-splitting step (a), the water is decomposed by thermochemical decomposition utilizing oxidation-reduction reaction between a metal and a metal oxide, or thermochemical decomposition utilizing oxidation-reduction reaction between metal oxides having different oxidation states from each other, to obtain the first source gas.

<4> The method according to <3> above, wherein in the water-splitting step (a), the water is decomposed by thermochemical decomposition utilizing oxidation-reduction reaction between iron oxides in different oxidation states, to obtain the first source gas.

<5> The method according to any one of <1> to <4> above, wherein in the water-splitting step (a) and/or the ammonia synthesis step (d), at least part of the required thermal energy is obtained from solar energy.

<6> The method according to <5> above, wherein the water-splitting step (a) and/or the ammonia synthesis step (d) are carried out in the light collecting section of a solar collecting device to obtain at least part of the required thermal energy from solar energy.

<7> The method according to any one of <1> to <6> above, wherein:
in the water-splitting step (a), the water is decomposed by thermochemical decomposition utilizing oxidation-reduction reaction between a metal and a metal oxide, or thermochemical decomposition utilizing oxidation-reduction reaction between metal oxides having different oxidation states from each other, to obtain the first source gas,
the water-splitting step (a) is carried out in a water-splitting/regenerating apparatus having a plurality of water splitting sections that hold a metal and/or metal oxide to be used for thermal decomposition,
while the water-splitting step (a) is being conducted in at least one of the plurality of water splitting sections, at least one used water splitting section among the plurality of water splitting sections is regenerated, and
the regenerated water splitting section is reutilized in the water-splitting step (a).

Effect of the Invention

According to the ammonia synthesis process of the invention, in order to remove oxygen from a source gas comprising hydrogen and oxygen that has been obtained by decomposition of water, separation of oxygen by an oxygen separating membrane or hydrogen separating membrane, and then production of water by reaction between oxygen and hydrogen or adsorption of hydrogen with an adsorption medium are used, and thereby efficient synthesis of ammonia can be achieved, even when water is used as the hydrogen source.

In particular, when a source gas containing hydrogen and oxygen is obtained by decomposing water through direct thermal decomposition or thermochemical decomposition, the obtained source gas will usually contain oxygen, and a particularly notable effect of the ammonia synthesis process of the invention is obtained in this case.

EXPLANATION OF SYMBOLS 1, 101 Water splitting sections
2, 2', 102 Oxygen separating membrane (hydrogen separating membrane) holders
3, 103 Oxidation catalyst holders
4, 104 Ammonia synthesizing sections
5, 105 Ammonia collecting sections
100 Apparatus for ammonia synthesis of the invention
150 Parabolic trough-shaped light collecting device
A First source gas containing hydrogen and oxygen
B Second source gas having lower oxygen concentration than first source gas
C Waste flow
D Third source gas having lower oxygen concentration than second source gas
E Nitrogen flow
F Feed flow
G Ammonia-containing flow
H Recirculating flow
I Ammonia water flow
J Liquid water

EMBODIMENTS FOR CARRYING OUT THE INVENTION

The ammonia synthesis process of the invention comprises at least a water-splitting step (a), a first oxygen removal step (b), a second oxygen removal step (c) and an ammonia synthesis step (d).

The steps (a) to (d) will now be explained in detail below.
<Water-Splitting Step (a)>

The ammonia synthesis process of the invention comprises a water-splitting step (a), wherein water is decomposed to obtain a first source gas containing hydrogen and oxygen.

Any thermal energy source may be used when thermal energy is necessary in this step, but nuclear thermal energy or solar energy, and especially solar energy, may be used and are preferred as they do not release carbon dioxide that is associated with the problem of global warming.

In the water-splitting step (a), the water may be decomposed by any method to obtain the first source gas comprising hydrogen and oxygen. The water splitting methods described below may therefore be used for decomposition of the water in the water-splitting step (a).
(Electrolysis)

Electrolysis, which is a method employing electrolysis of water, can yield high-purity hydrogen, and further modifications thereof are expected from the standpoint of running cost and apparatus size.

(Direct Thermal Decomposition)

Direct thermal decomposition of water is the most basic method in which water is decomposed to obtain hydrogen and oxygen, wherein water is directly decomposed to hydrogen and oxygen at a high temperature of several thousand degrees Celsius (° C.) through the reaction represented by the following formula 1:

$$H_2O \rightarrow H_2 + \tfrac{1}{2}O_2 \text{(several thousand degrees Celsius (° C.))} \quad \text{(Formula 1)}$$

This reaction requires a temperature of a few thousand degrees Celsius, but usage of a catalyst allows the temperature to be lower to around 2,000° C. However, the hydrogen obtained through direct thermal decomposition usually contains oxygen.

(Thermochemical Decomposition)

Thermochemical decomposition is a method in which water is decomposed at a lower temperature than by direct thermal decomposition, through a combination of chemical reactions. Thermochemical decomposition, especially thermochemical decomposition using oxidation-reduction reaction between a metal and a metal oxide, or thermochemical decomposition using oxidation-reduction reaction between metal oxides having different oxidation states from each other, and more particularly thermochemical decomposition using oxidation-reduction reaction between iron oxides having different oxidation states from each other, is suitable for scaling up, and plans are being made for its implementation. However, the hydrogen obtained by thermochemical decomposition usually contains oxygen. The heat sources used for thermochemical decomposition include solar energy and nuclear thermal energy, and especially solar energy. A very great variety of methods have been proposed for thermochemical decomposition, and they include the following.

(Thermochemical decomposition: Thermochemical decomposition using oxidation-reduction reaction between metals and metal oxides, or thermochemical decomposition using oxidation-reduction reaction between metal oxides having different oxidation states from each other)

A typical example of thermochemical decomposition is one utilizing oxidation-reduction reaction between a metal such as magnesium (Mg), aluminum (Al) or iron (Fe) and a metal oxide thereof, by the reaction formulas shown below (where M represents a metal element, and m represents the valence of the metal element M).

$$M + H_2O \rightarrow M_{2/m}O + H_2 \quad \text{(formula 2)}$$

$$M_{2/m}O \rightarrow M + \tfrac{1}{2}O_2 \quad \text{(formula 3)}$$

$$\text{Total reaction:} H_2O \rightarrow H_2 + \tfrac{1}{2}O_2$$

Another example of thermochemical decomposition is a method utilizing oxidation-reduction reaction between iron oxides having different oxidation states from each other, represented by the following reaction formulas:

$$3FeO + H_2O \rightarrow Fe_3O_4 + H_2 \quad \text{(Formula 4)}$$

$$Fe_3O_4 \rightarrow 3FeO + \tfrac{1}{2}O_2 \quad \text{(Formula 5)}$$

$$\text{Total reaction: } H_2O \rightarrow H_2 + \tfrac{1}{2}O_2$$

The metal and/or metal oxide used in the thermochemical decomposition utilizing oxidation-reduction reaction of a metal and/or metal oxide may be loaded as fine powder on a support having a fin structure, honeycomb structure, pellet structure or the like. This will allow less sintering of the metal and/or metal oxide that is to be used, thereby allowing a relatively large surface area to be Maintained.

Among thermochemical decomposition methods utilizing oxidation-reduction reaction of metals and/or metal oxides, thermochemical decomposition methods utilizing zinc are known as Zn (zinc) methods.

Methods of regenerating the metals and/or metal oxides used in such thermochemical decomposition include the following methods (i)-(iii):

(i) For regeneration of magnesium, aluminum, zinc, iron or the like, and especially for regeneration of magnesium, electrolytic methods in which a metal oxide produced by a hydrogen-producing reaction is reacted with seawater to yield a metal chloride, and the metal chloride is subjected to molten salt electrolysis.

(ii) For regeneration of magnesium, aluminum, zinc, iron or the like, and especially for regeneration of magnesium, thermal reduction methods in which the produced metal oxide is heated at high temperature under reduced pressure together with a reducing agent such as carbon or silicon and/or an inert gas such as nitrogen, and the metal vapor is recovered. Since a relatively large apparatus is used for reduction by these methods, it is preferred that the decomposition of water using the metal and/or metal oxide is carried out in a separate location from the regeneration of the used metal oxide. Methods for obtaining magnesium by regeneration of magnesium oxide by this manner are commonly referred to as "Pidgeon Processes".

(iii) For regeneration of iron, reduction firing methods in which a supply of carbon or carbon monoxide is fed to a produced metal oxide and reduction is accomplished directly by heat. The heat source used for such methods may be obtained with a light collecting/heat collecting lens, or by fuel combustion.

(Thermochemical Decomposition: I—S (Iodine-Sulfur) Cycle Methods)

Another typical example of thermochemical decomposition is known as the I—S cycle method, represented by the following reaction formula:

$$H_2SO_4 \rightarrow H_2O + SO_2 + \tfrac{1}{2}O_2 \text{(approximately 950° C.)} \quad \text{(Formula 6)}$$

$$2H_2O + SO_2 + I_2 \rightarrow H_2SO_4 + 2HI \text{(approximately 130° C.)} \quad \text{(Formula 7)}$$

$$2HI \rightarrow H_2 + I_2 \text{(approximately 400° C.)} \quad \text{(Formula 8)}$$

$$\text{Total reaction:} H_2O \rightarrow H_2 + \tfrac{1}{2}O_2$$

(Photocatalytic Decomposition)

Photocatalytic decomposition is a method in which a photocatalyst in contact with water is irradiated with light to decompose the water into hydrogen and oxygen. The method is preferred, since it allows production of hydrogen with use of the inexhaustible resources of water and sunlight. However, further research is necessary for implementation of this method. Oxygen may often be present in the hydrogen obtained by photocatalytic decomposition.

<First Oxygen Removal Step (b)>

The ammonia synthesis process of the invention comprises a first oxygen removal step (b), wherein the oxygen present in the first source gas is at least partially separated and removed with an oxygen separating membrane or hydrogen separating membrane, to obtain a second source gas having a lower oxygen concentration than the first source gas.

(Oxygen Separating Membrane)

The term "oxygen separating membrane" used for the invention is defined as a membrane that allows permeation of oxygen preferentially over hydrogen when it is contacted with a gas containing at least hydrogen and oxygen. The molar ratio of the oxygen permeation to the hydrogen permeation ($O_2/H_2$) at the operating temperature is, for example, at least 2, at least 10, at least 50, at least 100 or at least 1,000.

When an oxygen separating membrane is used for at least partial separation and removal of the oxygen present in the first source gas, the fraction that has not passed through the oxygen separating membrane is used as the second source gas having a lower oxygen concentration than the first source gas, while the fraction that has passed through the oxygen separating membrane is used as the fraction having a relatively high oxygen content, and may be discarded, recirculated for further removal of hydrogen, or utilized for another purpose.

Many such oxygen separating membranes are known, and reference may be made to Japanese Unexamined Patent Publication No. 2008-052188, for example. Specifically, there may be used an oxygen separating membrane comprising a complex oxide having a mixed conductivity for an oxygen ion and an electron, such as $CaTiO_3$.

(Hydrogen Separating Membrane)

The term "hydrogen separating membrane" used for the invention is defined as a membrane that allows permeation of hydrogen preferentially over oxygen when it is contacted with a gas containing at least hydrogen and oxygen. The molar ratio of the hydrogen permeation to the oxygen permeation ($H_2/O_2$) at the operating temperature is, for example, at least 2, at least 10, at least 50, at least 100 or at least 1,000.

When a hydrogen separating membrane is used for at least partial separation and removal of the oxygen present in the first source gas, the fraction that has passed through the hydrogen separating membrane is used as the second source gas having a lower oxygen concentration than the first source gas, while the fraction that has not passed through the hydrogen separating membrane is used as the fraction having a relatively high oxygen content, and may be discarded, recirculated for further removal of hydrogen, or utilized for another purpose.

Many such hydrogen separating membranes are known, and reference may be made to Japanese Unexamined Patent Publication No. 2008-055295, for example.

<Second Oxygen Removal Step (c)>

The ammonia synthesis process of the invention comprises a second oxygen removal step (c), wherein the oxygen in the second source gas having a lower oxygen concentration than the first source gas is reacted with hydrogen and removed as water, or is adsorbed onto an adsorption medium and removed, to obtain a third source gas having a lower oxygen concentration than the second source gas.

(Oxidation Catalyst)

According to the invention, an oxidation catalyst may be used in order for the oxygen in the second source gas to react with hydrogen and to remove it as water. The water produced by reaction between oxygen and hydrogen may be removed by adsorption onto zeolite or the like, or by temporary cooling of the water-containing source gas to below 100° C. for gas-liquid separation.

The term "oxidation catalyst" used for the invention is defined as a catalyst that promotes reaction between hydrogen and oxygen, i.e. reaction wherein oxygen oxidizes hydrogen to produce water. Many such oxidation catalysts are known, and examples include precious metal-containing catalysts such as platinum-containing catalysts, and base metal-containing catalysts such as cobalt-containing catalysts and nickel-containing catalysts. Among the catalysts, base metal-containing catalysts are preferred from the viewpoint of cost. An oxidation catalyst similar to the one used in Patent document 2, for example, which is a palladium-based catalyst loaded on an alumina support, may also be considered for use.

(Adsorption Medium)

The adsorption medium used to remove the oxygen in the second source gas by adsorption according to the invention may be a metal oxide adsorption medium.

The term "adsorption medium" used for the invention is defined as a medium that allows adsorption of oxygen preferentially over hydrogen, when it is contacted with a gas containing at least hydrogen and oxygen. Many such adsorption mediums are known, and the use of adsorption mediums similar to that used in patent document 3, for example, may be considered, i.e. the use of metal oxides of barium, potassium, iron or the like as described in U.S. Pat. No. 6,241,955 may be considered.

<Ammonia Synthesis Step (d)>

The ammonia synthesis process of the invention comprises an ammonia synthesis step (d), wherein the hydrogen in the third source gas having a lower oxygen concentration than the second source gas is reacted with nitrogen to synthesize ammonia.

A high temperature for synthesis of ammonia from hydrogen and nitrogen can be maintained accomplished with any desired thermal energy source, and especially with nuclear thermal energy or solar energy, particularly solar energy. This is preferred, since it does not involve release of carbon dioxide that is problematic in terms of global warming.

A large body of literature is known in regard to synthesis of ammonia from hydrogen and nitrogen, and reference may be made to Patent documents 1-3, for example. The catalysts used for synthesis of ammonia include iron-containing catalyst and ruthenium-containing catalysts, as well as platinum-containing catalysts and nickel-containing catalysts.

For synthesis of ammonia, therefore, as described in Patent document 3, for example, the ammonia synthesis catalyst layers are separated and a gas cooler is installed between each catalyst layer, so that the heat of reaction generated during the ammonia synthesis is recovered by the gas coolers, thereby lowering the outlet temperature of the ammonia synthesis reaction, whereby the conversion rate to ammonia can be improved and the circulating gas volume can be reduced as a result.

The nitrogen that is reacted with hydrogen in step (d) may be added to any of the first to third source gases. Specifically, for example, the nitrogen to be reacted with the hydrogen in step (d) may be added to the third source gas, to allow reduction in the volume of the first and second source gases to be treated in the first and second oxygen removal steps.

<Nitrogen Purification Step>

The nitrogen, as the other starting material for the ammonia synthesis process of the invention, may be obtained by any desired method. For example, it may be obtained by separation from air using cryogenic separation, membrane separation, pressure swing adsorption or the like. For cryogenic separation of air, the air is compressed while cooling to produce liquid air, and the difference in the boiling points of oxygen and nitrogen are utilized to separate the nitrogen from the liquid air. This method generally requires large-scale equipment, but high-purity nitrogen can be obtained.

<Ammonia Recovery Step>

Recovery of the ammonia produced in the ammonia synthesis step may be accomplished in any desired manner. For example, it may be accomplished by a wet recovery step in which the ammonia is absorbed into water for separation from the unreacted hydrogen and nitrogen, or a condensation step in which the ammonia is liquefied for separation from the unreacted hydrogen and nitrogen.

<Utilization of Solar Energy for Water-Splitting Step (a) and/or Ammonia Synthesis Step (d)>

As mentioned above, at least part of the required thermal energy, especially for the water-splitting step (a) and/or the ammonia synthesis step (d), may be obtained from solar energy. In this case, the water-splitting step (a) and/or the ammonia synthesis step (d) in the ammonia synthesis process of the invention may be carried out in the light collecting section of a solar collecting device to obtain at least part of the required thermal energy from solar energy.

Specifically, the water-splitting step (a) and/or the ammonia synthesis step (d) may be carried out in an apparatus for ammonia synthesis having a water splitting section and/or an ammonia synthesizing section, situated in the light collecting section of the solar collecting device. The water splitting section and the ammonia synthesizing section are the sections for the water-splitting step and the ammonia synthesis step, respectively, in the ammonia synthesis process of the invention.

The solar collecting device in this case may be a parabolic dish-type light collecting device, a solar tower-type light collecting device, a parabolic trough-shaped light collecting device, or the like. Specifically, a parabolic dish-type light collecting device is a light collecting device having a dish-shaped reflector for reflecting and converging sunlight, and a photo-receiving section that receives the converged light. Such a light collecting device achieves a high degree of concentration, and thus provides a high-temperature heat source, although at relatively high cost. A solar tower-type light collecting device is a light collecting device having a plurality of heliostats (reflectors) that reflect and converge sunlight, and a photo-receiving section situated above a photo-receiving tower. Such a light collecting device achieves high degree of concentration, and thus provides a high-temperature heat source, but the construction cost of the tower is high and advanced technology is required for control of the reflecting mirror. A parabolic trough-type light collecting device is a light collecting device having a trough-type reflector that reflects and converges sunlight, and a photo-receiving section that receives the converged light. Because such a light collecting device achieves a relatively low degree of concentration, the obtained heat source is a low-temperature heat source. In all of these light collecting devices, the reflector may be covered with a reflective material such as aluminum.

Figure 1:
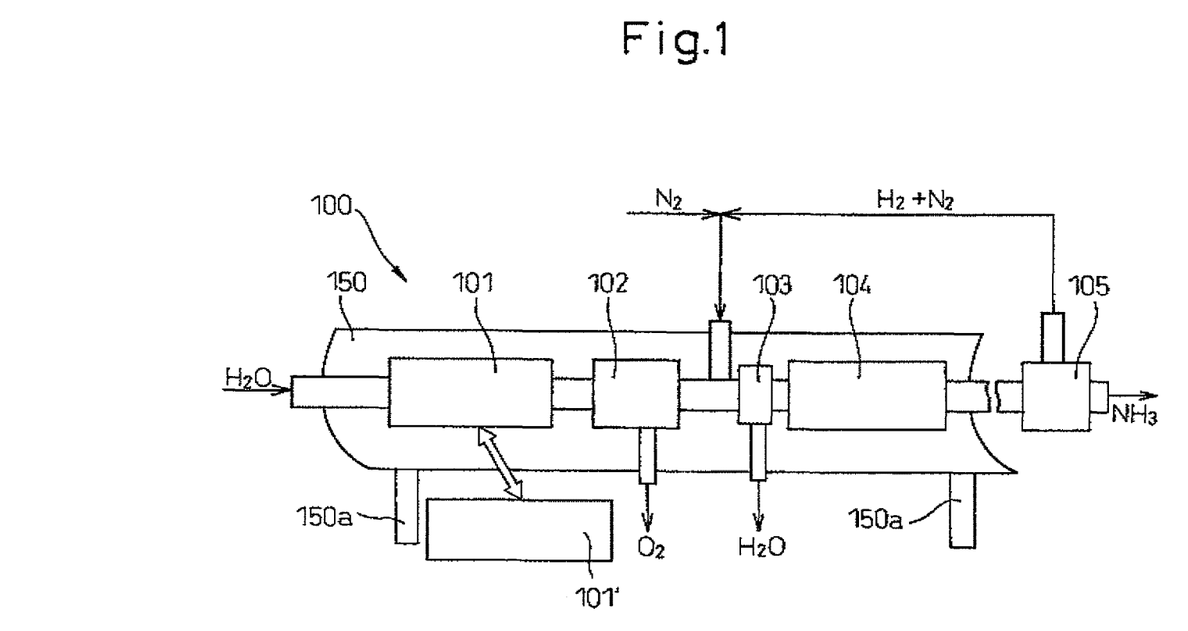
FIG. 1 is a diagram showing an example of an apparatus for ammonia synthesis used in the ammonia synthesis process of the invention.

The apparatus for ammonia synthesis used in the ammonia synthesis process of the invention may be as shown in FIG. 1, for example.

In the apparatus for ammonia synthesis 100 shown in FIG. 1, a parabolic trough-type light collecting device 150 with legs 150a is used. In the light collecting section of the parabolic trough-type light collecting device 150, there are arranged a water splitting section 101, an oxygen separating membrane (or hydrogen separating membrane) holder 102, an oxidation catalyst (or adsorption medium) holder 103, and an ammonia synthesizing section 104. In the apparatus for ammonia synthesis 100 shown in FIG. 1, by arranging these parts in the light collecting section of the light collecting device 150, a high temperature, such as 500° C. or higher, 600° C. or higher or 700° C. or higher, is maintained in those parts.

The apparatus for ammonia synthesis 100 may also have an optional ammonia collecting section 105. In this apparatus for ammonia synthesis 100, a heat-resistant conduit made of nickel/chromium alloy or the like may be used as a conduit for linking the constituent parts. Furthermore, in this apparatus for ammonia synthesis 100, there is no need for the fluid channel to be linear, and it may be meandering to have a required fluid channel length.

For use of the apparatus for ammonia synthesis 100, water ($H_2O$) is supplied to the water splitting section 101, and a first source gas comprising hydrogen and oxygen is produced by decomposition of the water in the water splitting section 101. The first source gas obtained in the water splitting section 101 is supplied to the oxygen separating membrane holder 102, and at least a portion of the oxygen in the first source gas is separated and discharged as oxygen ($O_2$), to obtain a second source gas having a lower oxygen concentration than the first source gas.

The second source gas obtained at the oxygen separating membrane holder 102 is supplied to the oxidation catalyst holder 103, and the oxygen in the second source gas is reacted with hydrogen and removed as water ($H_2O$), to obtain a third source gas having a lower oxygen concentration than the second source gas. The third source gas obtained at the oxidation catalyst holder 103 is combined with nitrogen ($N_2$) and the recirculating flow ($H_2+N_2$), to be fed to the ammonia synthesizing section 104 as feed flow, and the hydrogen and nitrogen are reacted to synthesize ammonia.

The product flow containing the synthesized ammonia is supplied to the ammonia collecting section 105, and the ammonia ($NH_3$) is recovered while the remainder is recirculated as recirculating flow ($H_2+_2$).

When hydrogen is generated at the water splitting section 101 by thermochemical decomposition, and especially by thermochemical decomposition using iron oxide, the used water splitting section 101 is can be replaced with the regenerated water splitting section 101', to allow continuous production of hydrogen. In this case, regeneration treatment of the water splitting section 101 is carried out in, while the water splitting section 101' is used for production of hydrogen.

<Water-Splitting/Regenerating Apparatus>

As mentioned above, in the water-splitting step (a) of the ammonia synthesis process of the invention, in order to obtain the first source gas, the water may be decomposed by thermochemical decomposition utilizing oxidation-reduction reaction between a metal and a metal oxide, or thermochemical decomposition utilizing oxidation-reduction reaction between metal oxides having different oxidation states from each other.

In such cases, the water-splitting step (a) is carried out in a water-splitting/regenerating apparatus having a plurality of water splitting sections that hold a metal and/or metal oxide to be used for thermal decomposition. Thereby, while the water-splitting step (a) is being conducted in at least one of the plurality of water splitting sections, at least one used water splitting section among the plurality of water splitting sections may be regenerated, and thus the regenerated water splitting section may be reutilized in the water-splitting step (a).

Figure 2:
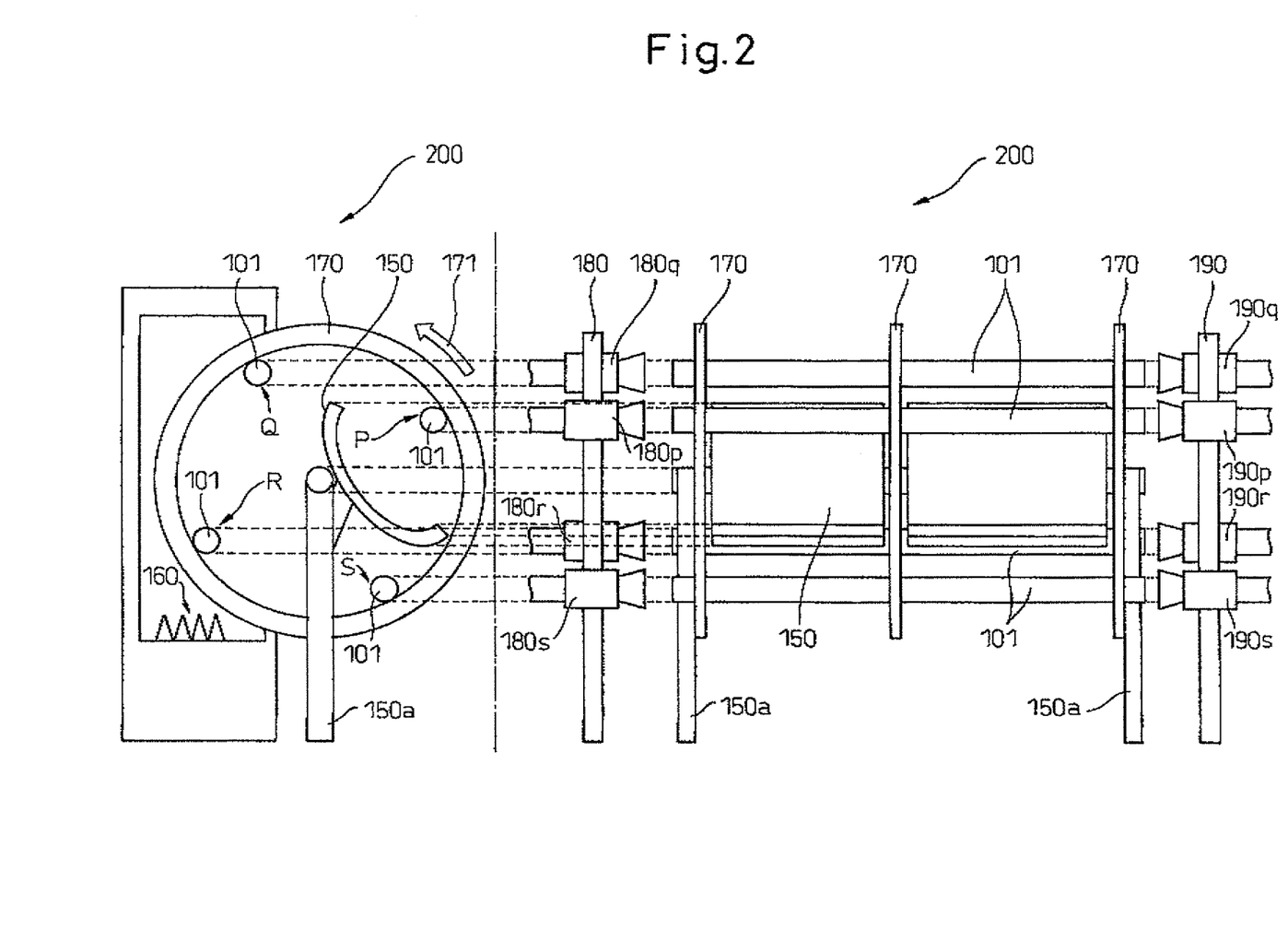
FIG. 2 is a diagram showing an example of a water-splitting/regenerating apparatus used in the ammonia synthesis process of the invention.

Specifically, for example, the decomposition of water in the water splitting section and the regeneration of the water splitting section may be accomplished with a water-splitting/regenerating apparatus such as illustrated in FIG. 2. The left side of FIG. 2 is a side view of the water-splitting/regenerating apparatus 200, while the right side of FIG. 2 is a front view of the water-splitting/regenerating apparatus 200.

In the apparatus 200 shown in FIG. 2, four water splitting sections 101 are fixed to a displacement rotating ring 170. By rotating the rotating ring 170, as indicated by the arrow 171, the four water splitting sections 101 are displaced between position P where the water is decomposed to produce hydrogen, and position R where the used water splitting section 101 is regenerated by the aforementioned thermal reduction method, for example.

The water splitting section 101 located at position P is situated so that it is supplied with solar energy by the parabolic trough-type light collecting device 150 with legs 150a. The water splitting section 101 located at position R is situated so that it is supplied with thermal energy 160 for regeneration, by fuel combustion or the like.

Also, in the apparatus 200 shown in FIG. 2, it is possible that water splitting sections 101 are also located at positions Q and S between position P and position R, and thereby residual gas is removed and the catalyst is replenished at positions Q and S, and purging is accomplished with an inert gas at position S.

The apparatus 200 shown in FIG. 2 has a linking column 180 with connectors 180p-s and a linking column 190 with connectors 190p-s. The connectors 180p and 190p are devices for linking the water splitting section 101 at position P to the previous and subsequent processes. The connectors 180q-s and 190q-s are devices for connecting the water splitting sections 101 at positions Q-S, respectively, to the inert gas feeder for purging, the reducing gas feeder for regeneration treatment, and the like.

Figure 3:
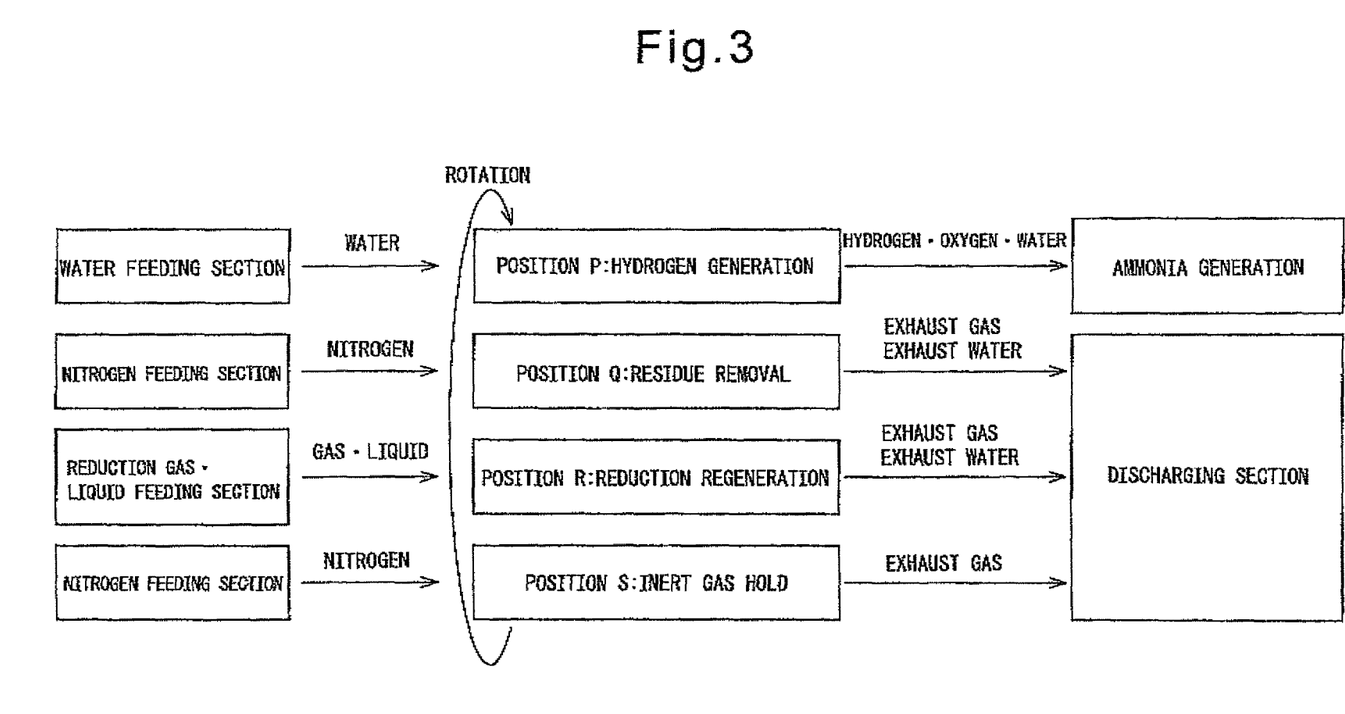
FIG. 3 is a diagram illustrating the water-splitting/regenerating apparatus of FIG. 2.

Thus, the apparatus 200 is designed, as shown in FIG. 3, so that at position P, water is supplied to the water splitting section 101 and the hydrogen and oxygen produced at the water splitting section 101, together with the residual water, are removed out; at position Q, removal of the residual gas, replenishment of the catalyst are carried out, and the like; at position R, the gas and/or liquid for reduction are supplied to and discharged from the water splitting section 101; and at position 5, purging is accomplished by the inert gas.

Figure 4:
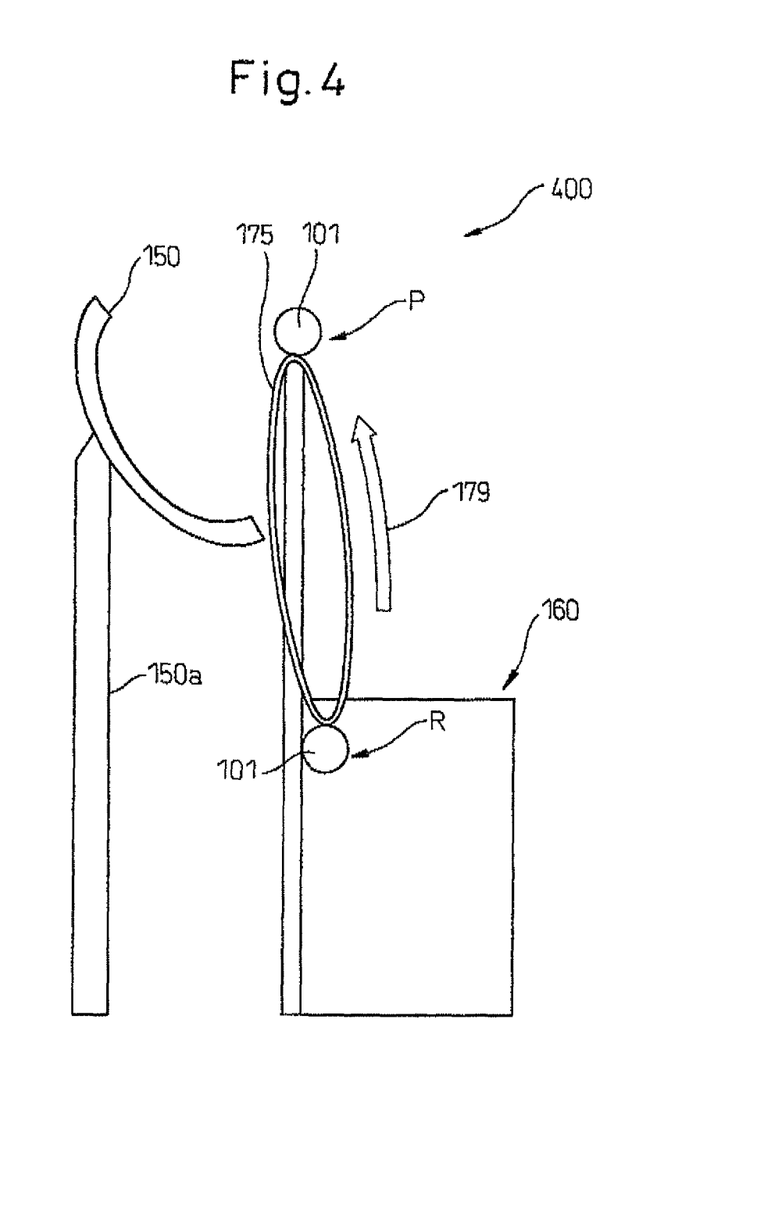
FIG. 4 is a diagram showing another example of a water-splitting/regenerating apparatus used in the ammonia synthesis process of the invention.

Specifically, for example, the decomposition of water in the water splitting section and the regeneration of the water splitting section may be accomplished with the apparatus shown in FIG. 4. FIG. 4 is a side view of the water-splitting/regenerating apparatus 400.

In the apparatus 400 shown in FIG. 4, a displacement orbital frame 175 and chain (not shown) or the like are used, and the water splitting section 101 is anchored to the chain, so that the water splitting section 101 is displaced along the displacement orbital frame 175 by driving the chain. By displacing the water splitting section 101 in this manner, the water splitting section 101 is displaced between position P where hydrogen is produced, and position R where regeneration treatment of the used metal oxide is carried out, as indicated by the arrow 179. Reference may be made to the explanation of the apparatus 200 of FIG. 2, for treatment at positions P and R in this case.

EXAMPLES

Example 1

In the ammonia synthesis process of Example 1, an oxygen separating membrane and oxidation catalyst are used for removal of the oxygen in the source gas. A process such as shown in FIG. 5 is used for this purpose.

Figure 5:
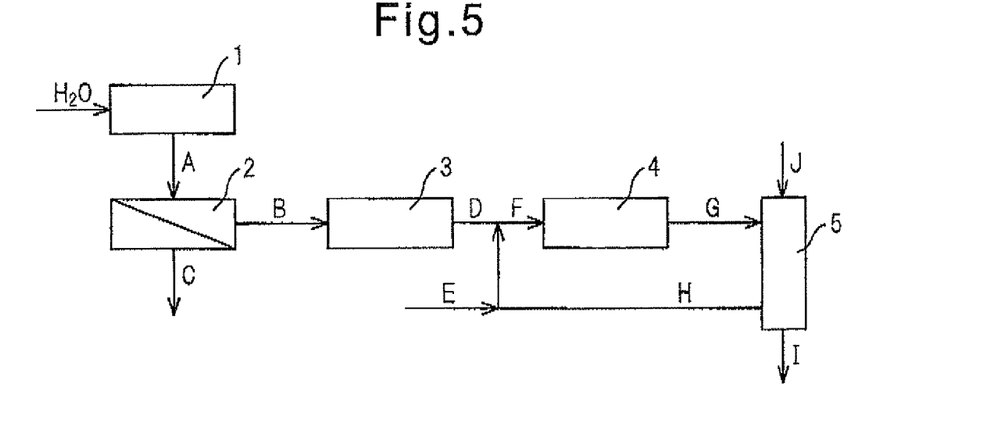
FIG. 5 is a diagram showing the ammonia synthesis process of Example 1.

In the process shown in FIG. 5, the water ($H_2O$) is decomposed in the water splitting section 1 to obtain a first source gas A containing hydrogen and oxygen. The first source gas A obtained in the water splitting section 1 is supplied to the oxygen separating membrane holder 2, and at least a portion of the oxygen in the first source gas A is separated and removed as waste flow C, to obtain a second source gas B having a lower oxygen concentration than the first source gas.

The second source gas B is supplied to the oxidation catalyst holder 3, and the oxygen in the second source gas B is reacted with hydrogen and removed as water, to obtain a third source gas D having a lower oxygen concentration than the second source gas. The third source gas D is combined with the nitrogen flow E and recirculating flow H, and supplied to the ammonia synthesizing section 4 as feed flow F, for reaction with nitrogen to synthesize ammonia.

The ammonia-containing flow G containing ammonia, which is obtained in this manner, is supplied to the ammonia collecting section 5, contacted with/absorbed in liquid water J, and recovered as ammonia water flow I. The remainder (recirculating flow) H, from which ammonia has been absorbed in the ammonia collecting section 5, is combined with the nitrogen flow E, and re-supplied to the ammonia synthesizing section 4 as feed flow F.

The material balance in the process of Example 1 is shown in Table 1 below. In this process, the ammonia production amount is 99.2 kg/h, and the concentration of the obtained ammonia water is 28%.

TABLE 1

| | | A | B | C | D | E | F | G | H | I | J |
|---|---|---|---|---|---|---|---|---|---|---|---|
| $H_2$ (g) | $Nm^3/h$ | 200 | 198.02 | 1.98 | 196.02 | | 4553.01 | 4356.99 | 4356.99 | | |
| $O_2$ (g) | $Nm^3/h$ | 100 | 1 | 99 | 0 | | 0 | | | | |
| $N_2$ (g) | $Nm^3/h$ | | | | | 65.34 | 1517.67 | 1452.33 | 1452.33 | | |
| $H_2O$ (g) | $Nm^3/h$ | | | | 2 | | 2 | 2 | | | |
| $NH_3$ (g) | $Nm^3/h$ | | | | | | | 130.68 | | | |
| $H_2O$ (l) | kg/h | | | | | | | | | 255.026 | 255.026 |
| $NH_3$ (l) | kg/h | | | | | | | | | 99.17679 | |
| Temperature | °C. | 25 | 800 | 800 | 326 | 25 | 412 | 450 | 25 | 25 | 25 |
| Pressure | MPa | 1 | 1 | 0.01 | 1 | 1 | 1 | 1 | 1 | 0.1 | 1 |

Example 2

In the ammonia synthesis process of Example 2, an oxygen separating membrane and oxidation catalyst are used for removal of the oxygen in the source gas. A process such as shown in FIG. 6 is used for this purpose.

Figure 6:
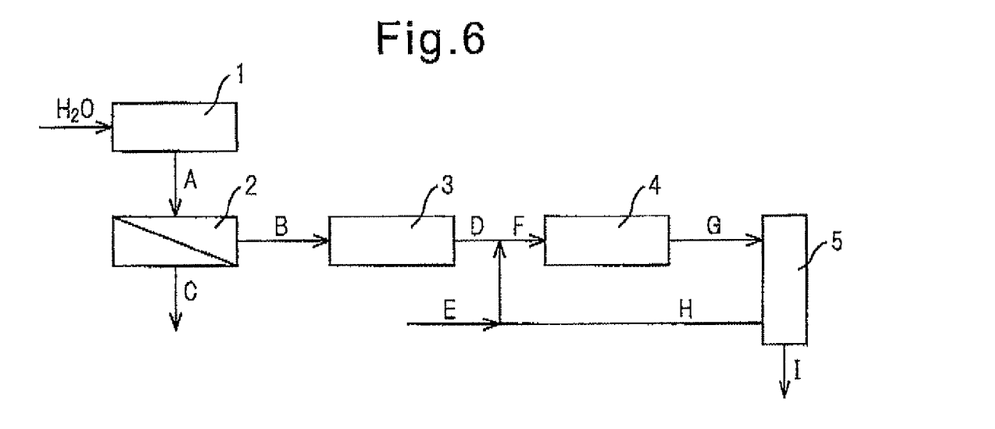
FIG. 6 is a diagram showing the ammonia synthesis process of Example 2.

The process shown in FIG. 6 is carried out in the same manner as the process of Example 1, except that ammonia is synthesized at a pressure of 10 MPa in the ammonia synthesizing section 4, and a condenser is used for recovery of ammonia at the ammonia collecting section 5.

Figure 8:
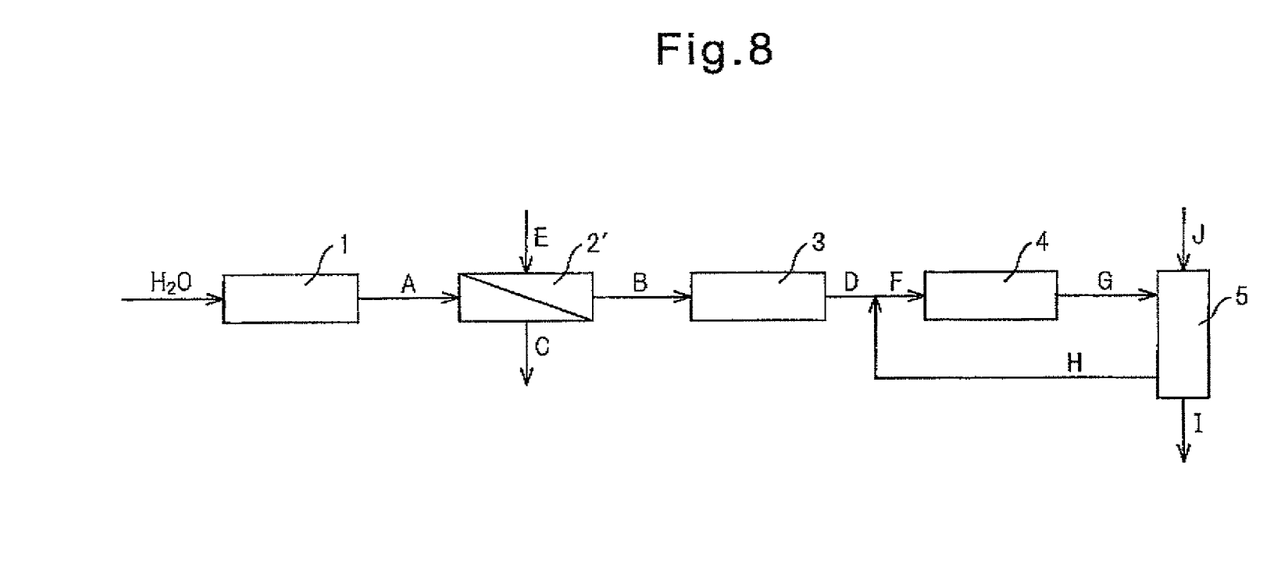
FIG. 8 is a diagram showing the ammonia synthesis process of Example 4.

The material balance in the process of Example 2 is shown in Table 2 below. In this process, the ammonia production amount is 99.2 kg/h, and the concentration of the obtained ammonia water is 100%.

obtained in the water splitting section 1 is supplied to the hydrogen separating membrane holder 2', and at least a portion of the oxygen in the first source gas A is separated and removed as waste flow C, to obtain a second source gas B having a lower oxygen concentration than the first source gas. At the hydrogen separating membrane 2, nitrogen flow E is supplied to the permeation side, so that the second source gas, that has passed through the hydrogen permeable film 2, is mixed with nitrogen.

TABLE 2

|  |  | A | B | C | D | E | F | G | H | I |
|---|---|---|---|---|---|---|---|---|---|---|
| $H_2$ (g) | $Nm^3/h$ | 200 | 198.02 | 1.98 | 196.02 |  | 1031.439 | 835.418571 | 835.4186 |  |
| $O_2$ (g) | $Nm^3/h$ | 100 | 1 | 99 | 0 |  | 0 |  |  |  |
| $N_2$ (g) | $Nm^3/h$ |  |  |  |  | 65.34 | 343.8129 | 278.472857 | 278.4729 |  |
| $H_2O$ (g) | $Nm^3/h$ |  |  |  | 2 |  | 2 | 2 | 2 |  |
| $NH_3$ (g) | $Nm^3/h$ |  |  |  |  |  |  | 130.68 |  |  |
| $H_2O$ (l) | kg/h |  |  |  |  |  |  |  |  |  |
| $NH_3$ (l) | kg/h |  |  |  |  |  |  |  |  | 99.17679 |
| Temperature | °C. | 25 | 800 | 800 | 244 | 25 | 330 | 500 | 25 | 25 |
| Pressure | MPa | 1 | 1 | 0.01 | 1 | 0.1 | 10 | 10 | 10 | 1 |

Example 3

In the ammonia synthesis process of Example 3, an oxygen separating membrane and oxidation catalyst are used for removal of the oxygen in the source gas. A process such as shown in FIG. 7 is used for this purpose.

Figure 7:
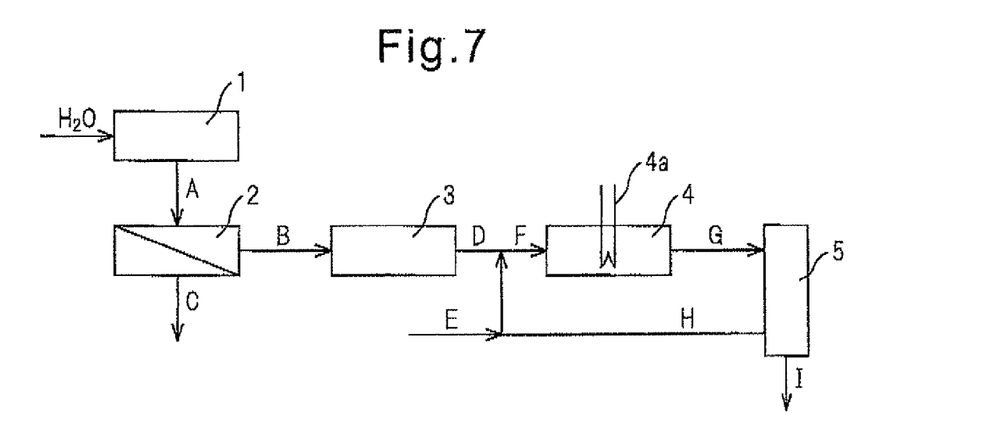
FIG. 7 is a diagram showing the ammonia synthesis process of Example 3.

The process shown in FIG. 7 is carried out in the same manner as the process of Example 1, except that in the ammonia synthesizing section 4, a gas cooler is situated between the front half and back half of the ammonia synthesizing section 4, and a condenser is used for recovery of ammonia at the ammonia collecting section 5.

The material balance in the process of Example 3 is shown in Table 3 below. In this process, the ammonia production amount is 99.2 kg/h, and the concentration of the obtained ammonia water is 100%.

The second source gas B is supplied to the oxidation catalyst holder 3, and the oxygen in the second source gas B is reacted with hydrogen and removed as water, to obtain a third source gas D having a lower oxygen concentration than the second source gas. The third source gas D is combined with the recirculating flow H, and supplied to the ammonia synthesizing section 4 as feed flow F, to synthesize ammonia.

The ammonia-containing flow G containing ammonia which is obtained in this manner is supplied to the ammonia collecting section 5, contacted with/absorbed in liquid water J, and recovered as ammonia water flow I. The remaining

TABLE 3

|  |  | A | B | C | D | E | F | G | H | I |
|---|---|---|---|---|---|---|---|---|---|---|
| $H_2$ (g) | $Nm^3/h$ | 200 | 198.2 | 1.98 | 196.02 |  | 699.2983 | 503.278344 | 503.2783 |  |
| $O_2$ (g) | $Nm^3/h$ | 100 | 1 | 99 | 0 |  | 0 |  |  |  |
| $N_2$ (g) | $Nm^3/h$ |  |  |  |  | 65.34 | 233.0994 | 167.759448 | 167.7594 |  |
| $H_2O$ (g) | $Nm^3/h$ |  |  |  | 2 |  | 2 | 2 | 2 |  |
| $NH_3$ (g) | $Nm^3/h$ |  |  |  |  |  |  | 130.68 |  |  |
| $H_2O$ (l) | kg/h |  |  |  |  |  |  |  |  |  |
| $NH_3$ (l) | kg/h |  |  |  |  |  |  |  |  | 99.17679 |
| Temperature | °C. | 25 | 800 | 800 | 264 | 25 | 350 | 450 | 25 | 25 |
| Pressure | MPa | 1 | 1 | 0.01 | 1 | 0.1 | 10 | 10 | 10 | 1 |

Example 4

In the ammonia synthesis process of Example 4, a hydrogen separating membrane and oxidation catalyst are used for removal of the oxygen in the source gas. A process such as shown in FIG. 8 is used for this purpose.

In the process shown in FIG. 8, the water ($H_2O$) is decomposed in the water splitting section 1 to obtain a first source gas A containing hydrogen and oxygen. The first source gas A recirculating flow H, from which ammonia has been absorbed in the ammonia collecting section 5, is combined with the nitrogen flow E, and re-supplied to the ammonia synthesizing section 4 as feed flow F.

The material balance in the process of Example 4 is shown in Table 4 below. In this process, the ammonia production amount is 96.1 kg/h, and the concentration of the obtained ammonia water is 28%.

TABLE 4

|  |  | A | B | C | D | E | F | G | H | I | J |
|---|---|---|---|---|---|---|---|---|---|---|---|
| $H_2$ (g) | $Nm^3/h$ | 200 | 191.973 | 8.027027 | 189.973 |  | 4412.554 | 4222.58108 | 4222.581 |  |  |
| $O_2$ (g) | $Nm^3/h$ | 100 | 1 | 99 |  |  |  |  |  |  |  |
| $N_2$ (g) | $Nm^3/h$ |  |  | 2.675676 |  | 2.675676 | 63.99099 | 1410.203 | 1407.52703 | 1407.527 |  |
| $H_2O$ (g) | $Nm^3/h$ |  |  |  |  | 2 |  | 2 | 2 |  |  |
| $NH_3$ (g) | $Nm^3/h$ |  |  |  |  |  |  | 126.648649 |  |  |  |
| $H_2O$ (l) | kg/h |  |  |  |  |  |  |  |  | 247.1587 | 247.1587 |
| $NH_3$ (l) | kg/h |  |  |  |  |  |  |  |  | 96.11728 |  |

TABLE 4-continued

|  |  | A | B | C | D | E | F | G | H | I | J |
|---|---|---|---|---|---|---|---|---|---|---|---|
| Temperature | °C. | 25 | 400 | 400 | 25 | 25 | 412 | 450 | 25 | 25 | 25 |
| Pressure | MPa | 2 | 1 | 2 | 1 | 1 | 1 | 1 | 1 | 0.1 | 1 |

Example 5

In the ammonia synthesis process of Example 5, a hydrogen separating membrane and oxidation catalyst are used for removal of the oxygen in the source gas. A process such as shown in FIG. 9 is used for this purpose.

Figure 9:
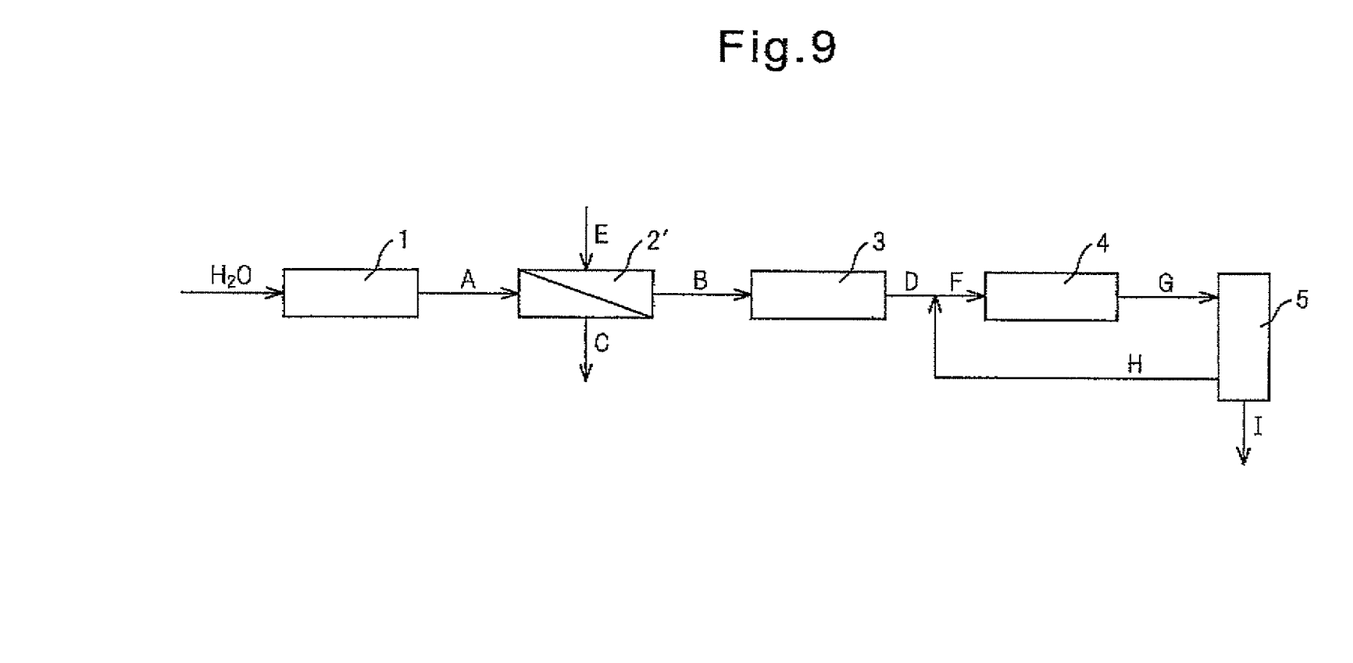
FIG. 9 is a diagram showing the ammonia synthesis process of Example 5.

The process shown in FIG. 9 is carried out in the same manner as the process of Example 3, except that ammonia is synthesized at a pressure of 10 MPa in the ammonia synthesizing section 4, and a condenser is used for recovery of ammonia at the ammonia collecting section 5.

The material balance in the process of Example 5 is shown in Table 5 below. In this process, the ammonia production amount is 96.1 kg/h, and the concentration of the obtained ammonia water is 100%.

TABLE 5

|  |  | A | B | C | D | E | F | G | H | I |
|---|---|---|---|---|---|---|---|---|---|---|
| $H_2$ (g) | $Nm^3/h$ | 200 | 191.973 | 8.027027 | 189.973 |  | 999.6197 | 809.646718 | 809.6467 |  |
| $O_2$ (g) | $Nm^3/h$ | 100 | 1 | 99 |  |  |  |  |  |  |
| $N_2$ (g) | $Nm^3/h$ |  | 2.675676 |  | 2.675676 | 63.99099 | 272.5579 | 269.882239 | 269.8822 |  |
| $H_2O$ (g) | $Nm^3/h$ |  |  |  | 2 |  | 2 | 2 |  |  |
| $NH_3$ (g) | $Nm^3/h$ |  |  |  |  |  |  | 126.648649 |  |  |
| $H_2O$ (l) | kg/h |  |  |  |  |  |  |  |  |  |
| $NH_3$ (l) | kg/h |  |  |  |  |  |  |  |  | 96.11728 |
| Temperature | °C. | 25 | 400 | 400 | 25 | 25 | 330 | 500 | 25 | 25 |
| Pressure | MPa | 1 | 2 | 1 | 2 | 2 | 10 | 10 | 10 | 10 |

Example 6

In the ammonia synthesis process of Example 6, a hydrogen separating membrane and oxidation catalyst are used for removal, of the oxygen in the source gas. A process such as shown in FIG. 10 is used for this purpose.

Figure 10:
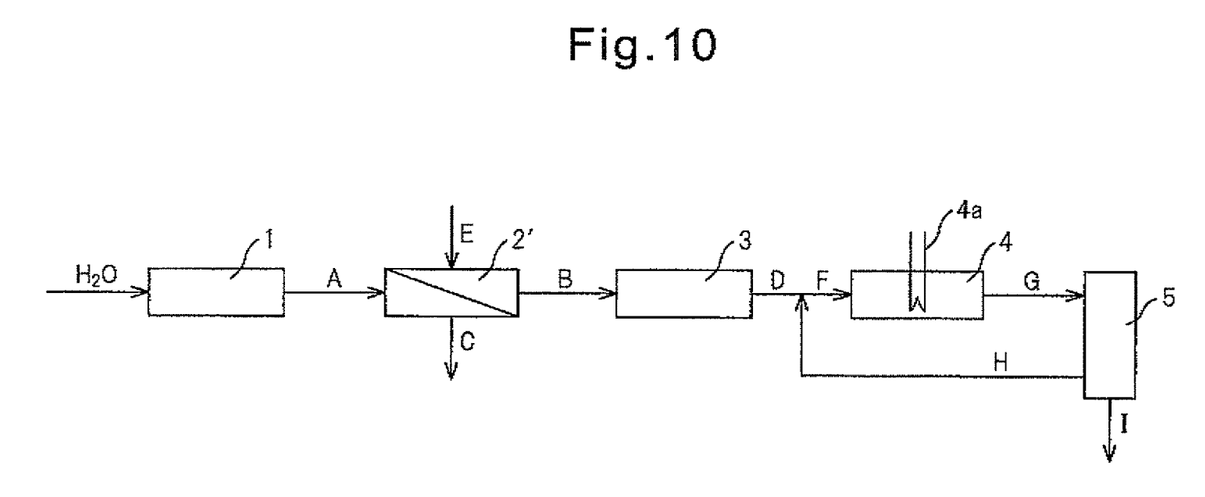
FIG. 10 is a diagram showing the ammonia synthesis process of Example 6.

The process shown in FIG. 10 is carried out in the same manner as the process of Example 4, except that in the ammonia synthesizing section 4, a gas cooler is situated between the front half and back end of the ammonia synthesizing section 4, and a condenser is used for recovery of ammonia at the ammonia collecting section 5.

The material balance in the process of Example 6 is shown in Table 6 below. In this process, the ammonia production amount is 96.1 kg/h, and the concentration of the obtained ammonia water is 100%.

TABLE 6

|  |  | A | B | C | D | E | F | G | H | I |
|---|---|---|---|---|---|---|---|---|---|---|
| $H_2$ (g) | $Nm^3/h$ | 200 | 191.973 | 8.027027 | 189.973 |  | 677.7257 | 487.752694 | 487.7527 |  |
| $O_2$ (g) | $Nm^3/h$ | 100 | 1 | 99 |  |  |  |  |  |  |
| $N_2$ (g) | $Nm^3/h$ |  | 2.675676 |  | 2.675676 | 63.99099 | 165.2599 | 162.584231 | 162.5842 |  |
| $H_2O$ (g) | $Nm^3/h$ |  |  |  | 2 |  | 2 | 2 |  |  |
| $NH_3$ (g) | $Nm^3/h$ |  |  |  |  |  |  | 126.648649 |  |  |
| $H_2O$ (l) | kg/h |  |  |  |  |  |  |  |  |  |
| $NH_3$ (l) | kg/h |  |  |  |  |  |  |  |  | 96.11728 |
| Temperature | °C. | 25 | 400 | 400 | 25 | 25 | 350 | 450 | 25 | 25 |
| Pressure | MPa | 1 | 2 | 1 | 2 | 2 | 10 | 10 | 10 | 10 |

The invention claimed is:

1. An ammonia synthesis method comprising:
   (a) a water-splitting step in which water is decomposed to obtain a first source gas comprising hydrogen and oxygen,
   (b) a first oxygen removal step in which the oxygen contained in the first source gas is at least partially separated and removed by an oxygen separating membrane or hydrogen separating membrane to obtain a second source gas having a lower oxygen concentration than the first source gas,
   (c) a second oxygen removal step in which the oxygen in the second source gas is reacted with hydrogen to produce water for removal, or is adsorbed onto an adsorption medium for removal, to obtain a third source gas having a lower oxygen concentration than the second source gas, and
   (d) an ammonia synthesis step in which the hydrogen in the third source gas is reacted with nitrogen to synthesize ammonia,
   wherein:
   in the water-splitting step (a), the water is decomposed by thermochemical decomposition utilizing oxidation-reduction reaction between a metal and a metal oxide, or thermochemical decomposition utilizing oxidation-reduction reaction between metal oxides having different oxidation states from each other, to obtain the first source gas,
   the water-splitting step (a) is carried out in a water-splitting/regenerating apparatus having a plurality of water-splitting sections that hold a metal and/or metal oxide to be used for thermal decomposition, while the water-splitting step (a) is being conducted in at least one of the plurality of water-splitting sections, at least one used water-splitting section among the plurality of water-splitting sections is regenerated by:
(i) an electrolytic method in which a metal oxide produced by a hydrogen-producing reaction is reacted with seawater to yield a metal chloride and the metal chloride is subjected to molten salt electrolysis, or
(ii) a reduction firing method in which a supply of carbon or carbon monoxide is fed to a metal oxide produced by a hydrogen-producing reaction and reduction is accomplished directly by heat, and
the regenerated water-splitting section is reutilized in the water-splitting step (a).

2. The method according to claim 1, wherein in the water-splitting step (a), the water is decomposed by thermochemical decomposition utilizing oxidation-reduction reaction between iron oxides in different oxidation states, to obtain the first source gas.

3. The method according to claim 1, wherein in the water-splitting step (a) and/or the ammonia synthesis step (d), at least part of a required thermal energy is obtained from solar energy.

4. The method according to claim 3, wherein the water-splitting step (a) and/or the ammonia synthesis step (d) are carried out in a light collecting section of a solar collecting device to obtain at least part of the required thermal energy from solar energy.

5. The method according to claim 2, wherein in the water-splitting step (a) and/or the ammonia synthesis step (d), at least part of the required thermal energy is obtained from solar energy.

6. The method according to claim 5, wherein the water-splitting step (a) and/or the ammonia synthesis step (d) are carried out in the light collecting section of a solar collecting device to obtain at least part of the required thermal energy from solar energy.

* * * * *